(12) United States Patent
Kadowaki

(10) Patent No.: US 9,915,859 B2
(45) Date of Patent: Mar. 13, 2018

(54) OPTICAL ELEMENT, LIGHT SOURCE DEVICE USING THE SAME, AND PROJECTION DISPLAY APPARATUS

(71) Applicant: CANON KABUSHIKI KAISHA, Tokyo (JP)

(72) Inventor: Ryota Kadowaki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/171,981

(22) Filed: Jun. 2, 2016

(65) Prior Publication Data

US 2016/0357097 A1 Dec. 8, 2016

(30) Foreign Application Priority Data

Jun. 5, 2015 (JP) .................................. 2015-115236
May 12, 2016 (JP) .................................. 2016-096258

(51) Int. Cl.
*G03B 21/20* (2006.01)
*G02B 5/02* (2006.01)

(52) U.S. Cl.
CPC ......... *G03B 21/204* (2013.01); *G02B 5/0242* (2013.01); *G03B 21/208* (2013.01); *G03B 21/2066* (2013.01)

(58) Field of Classification Search
CPC .... G03B 21/28; G03B 21/145; G03B 21/204; G03B 21/208; H01L 33/46; H01L 33/54; H01L 33/56; H01L 33/60; H01L 33/505
See application file for complete search history.

(56) References Cited

U.S. PATENT DOCUMENTS

| 9,405,019 | B2* | 8/2016 | Ogura | G01T 1/20 |
| 2010/0140648 | A1* | 6/2010 | Harada | H01L 33/60 |
| | | | | 257/98 |
| 2011/0309384 | A1* | 12/2011 | Ito | H01L 33/505 |
| | | | | 257/88 |
| 2012/0201030 | A1* | 8/2012 | Yuan | G02B 26/008 |
| | | | | 362/293 |
| 2012/0236582 | A1* | 9/2012 | Waragaya | H01L 33/507 |
| | | | | 362/510 |
| 2013/0126930 | A1* | 5/2013 | Kabuki | C09K 11/646 |
| | | | | 257/98 |
| 2014/0268063 | A1 | 9/2014 | Akiyama et al. | |
| 2015/0029466 | A1* | 1/2015 | Sakata | H01S 5/1092 |
| | | | | 353/31 |
| 2015/0098065 | A1 | 4/2015 | Tanaka | |
| 2016/0040857 | A1 | 2/2016 | Inoue | |

FOREIGN PATENT DOCUMENTS

| JP | 2012-189938 A | 10/2012 |
| JP | 2012-199075 A | 10/2012 |
| JP | 2015-11302 A | 1/2015 |
| JP | 2015-60035 A | 3/2015 |
| JP | 2015-121634 A | 7/2015 |
| JP | 2015-161801 A | 9/2015 |

* cited by examiner

*Primary Examiner* — Sultan Chowdhury
(74) *Attorney, Agent, or Firm* — Canon U.S.A., Inc. IP Division

(57) ABSTRACT

A fluorescent element includes a fluorescent light layer that converts a light flux from an LD light source into light having a different wavelength, a scattering layer, and a reflective element. The fluorescent light layer is provided between the scattering layer and the reflective element.

18 Claims, 11 Drawing Sheets

OPTICAL ELEMENT, LIGHT SOURCE DEVICE USING THE SAME, AND PROJECTION DISPLAY APPARATUS

BACKGROUND OF THE INVENTION

Field of the Invention

The present invention relates to an optical element, a light source device using the optical element, and a projection display apparatus.

Description of the Related Art

In recent years, a projector including a light source device including a solid light source, such as a laser diode (hereinafter referred to as LD) light source and an LED light source, and a fluorescent element that converts a portion of excitation light emitted from the solid light source into fluorescent light having a wavelength different from the wavelength of the excitation light has been developed.

Such a light source device is disclosed in JP 2012-189938 A.

JP 2012-189938 A discloses a light source device including a light source unit that includes a plurality of blue LDs, a light source unit including a plurality of red LDs, and a fluorescent element having a fluorescent light layer that is provided on a transmissive substrate and emits green-color light by excitation by blue-color light. With a portion of the light from the blue LD working as excitation light and the rest of the portion of the light passing through the fluorescent element as unconverted light, the fluorescent element emits blue-color light, green-color light, and red-color light.

As in the light source device disclosed in JP 2012-189938 A, in which the fluorescent element having a fluorescent light layer that emits fluorescent light by excitation by blue-color light, the light amount of blue-color light tends to be smaller than the light amount of green-color light and red-color light, because the blue-color light is used as excitation light. Therefore, the color balance of a projected image might be degraded.

SUMMARY OF THE INVENTION

An objective of the present invention is to provide an optical element that is capable of minimizing degradation of the color balance of a projected image, a light source device using the optical element, and a projection display apparatus.

To achieve the objective, the optical element according to an embodiment of the present invention includes a wavelength converting layer that converts a portion of a light flux from a light source into a converted light having a wavelength different from the wavelength of the light flux from the light source, a first scattering layer that includes first particles and a first binder supporting the first particle and scatters the light flux from the light source and the light flux from the wavelength converting layer, and a reflector that reflects the light flux from the wavelength converting layer, where the wavelength converting layer is provided between the first scattering layer and the reflector.

Further features of the present invention will become apparent from the following description of exemplary embodiments (with reference to the attached drawings).

DESCRIPTION OF THE EMBODIMENTS

Figure 1:
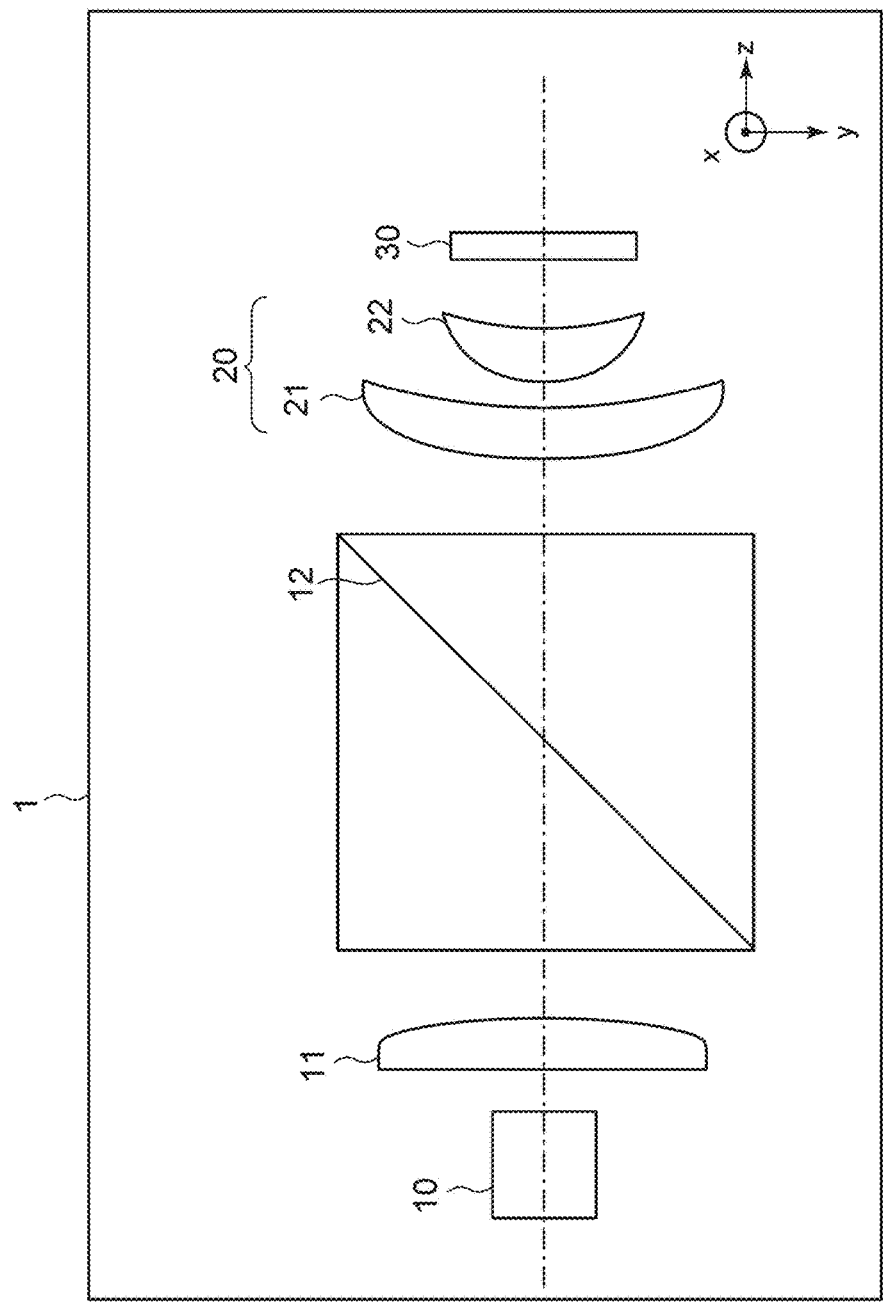
FIG. 1 illustrates an arrangement of a light source device according to a first embodiment of the present invention.

A preferable embodiment of the present invention will now be described referring to the drawings. The configuration of the embodiment, such as a relative position between constituent parts, should suitably be modified according to structures and conditions of an apparatus to which the invention is applied. The present invention is not limited to the embodiment described below, and various modifications and alterations can be made without departing from the spirit and scope of the present invention.

First Embodiment

With reference to FIGS. 1 to 7, the structure of a reflective fluorescent combined element (hereinafter referred to as fluorescent element) 30 serving as an optical element according to a first embodiment of the present invention and the structure of a light source device 1 on which the fluorescent element 30 can be mounted will be described below.

FIG. 1 illustrates the arrangement of the light source device 1. As illustrated in FIG. 1, the light source device 1 includes an LD light source 10, a collimator lens system 11 that receives a light flux from the LD light source 10 and has a positive power, a dichroic polarization beam splitter 12, a condenser lens system 20 including condenser lenses 21 and 22, and the fluorescent element 30.

In FIG. 1, the optical axis direction of the collimator lens system 11 or the condenser lens system 20 is z axis direction, and the direction that intersects the z axis direction at right angles and is parallel to a plane parallel to both the normal direction of the polarization split surface of the dichroic polarization beam splitter 12 and the z axis direction is y axis direction. The direction perpendicular to both the z axis direction and y axis direction is x axis direction.

A mechanism of the light source device 1 emitting light fluxes of red, green, and blue (RGB) will now be described.

Excitation light emitted as a diverging light from the LD light source 10 enters the collimator lens system 11. The collimator lens system 11 having a positive power outputs excitation light as a collimated light, and the excitation light then enters the dichroic polarization beam splitter 12.

Figure 2:
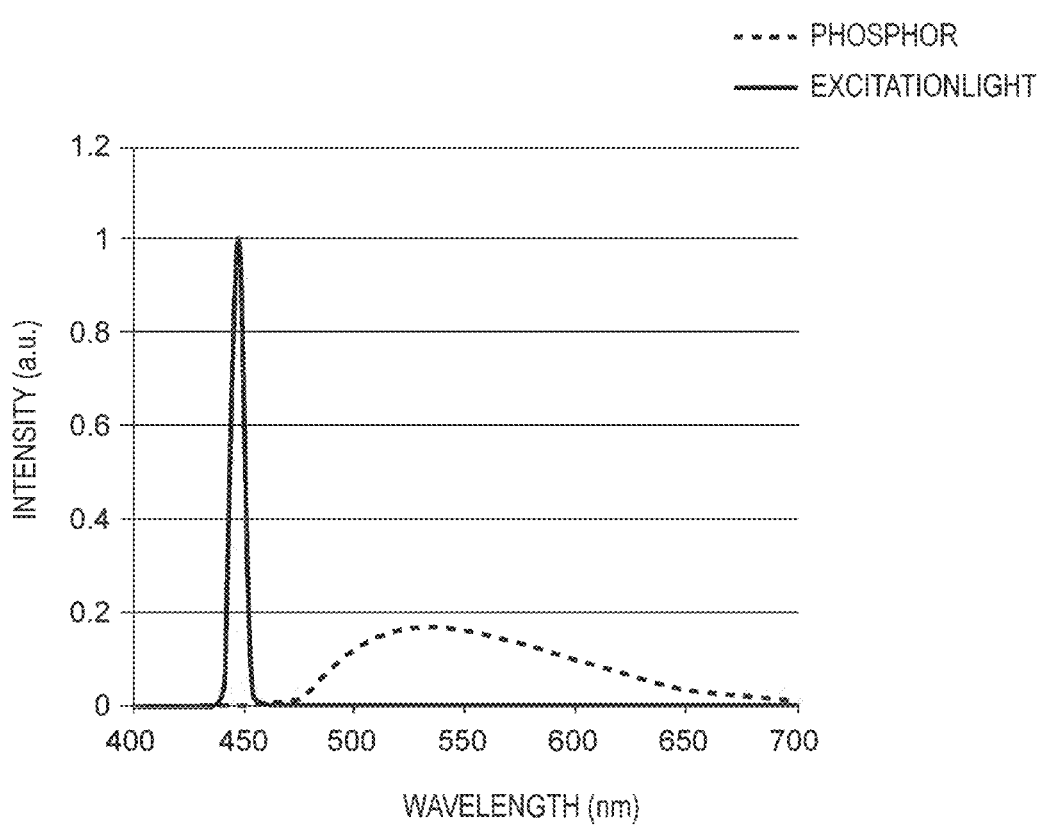
FIG. 2 illustrates an example of wavelength distribution of excitation light and fluorescent light according to the first embodiment of the present invention.

As illustrated in FIG. 2, the excitation light from the LD light source 10 is a light in the blue-color band range having the center wavelength of 445 nm, and the fluorescent light output from the fluorescent element 30 is a light in the range of red-color band and green-color band.

Figure 3:
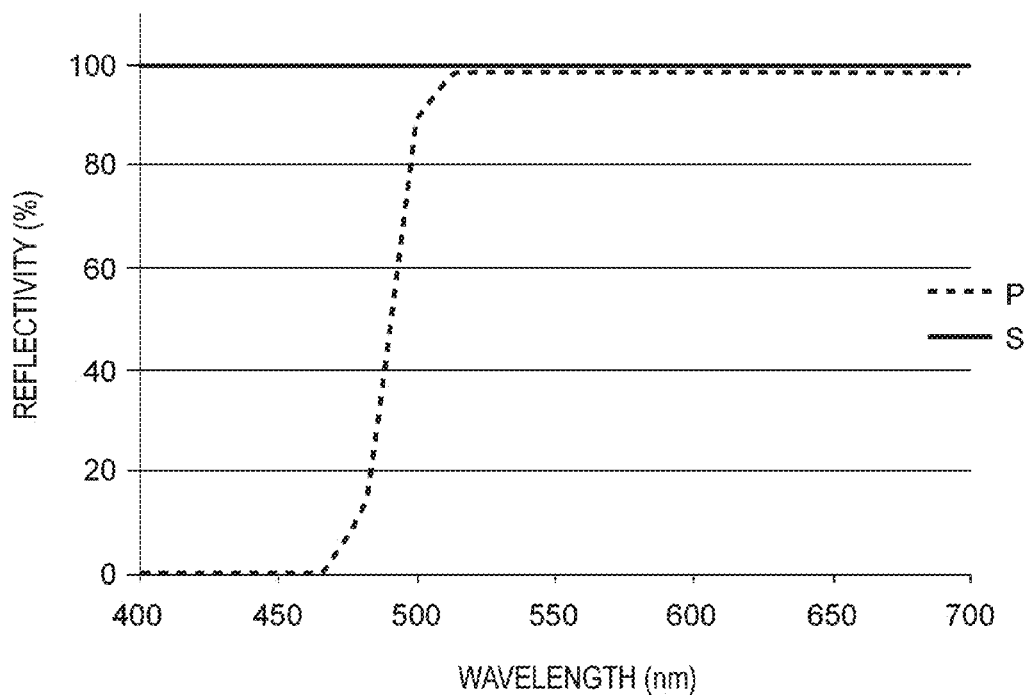
FIG. 3 is a figure for explaining a wavelength characteristic of a dichroic polarization beam splitter according to the first embodiment of the present invention.

As illustrated in FIG. 3, the dichroic polarization beam splitter 12 functions as a polarization beam splitter that allows, when receiving a light having a wavelength within the band range of the excitation light from the LD light source 10, p-polarized light to pass therethrough and reflects s-polarized light. For light having a wavelength outside the band range of the excitation light, the dichroic polarization beam splitter functions as a dichroic mirror and reflects light regardless of a polarization direction of the light.

Since light from the LD light source 10 is a p-polarized light (a polarized light oscillating in a direction parallel to y-z plane), the light passes through the dichroic polarization beam splitter 12 and enters the fluorescent element 30 via the condenser lens system 20.

The fluorescent element 30 is an optical element that converts a portion of the light from the LD light source 10 into a converted light having a wavelength different from the wavelength of the light from the LD light source 10 and outputs the converted light and an unconverted light having the same wavelength as the light from the LD light source 10. The fluorescent element 30 will specifically be described later.

In the embodiment, the unconverted light is light in the blue-color band range, and the converted light is light in the range of green-color band and red-color band. Since the light emitted from the fluorescent element 30 has random polarization directions, the s-polarized light included in the unconverted light and the converted light are reflected by the dichroic polarization beam splitter 12 to be directed to the downstream (rear side) system.

The light source device 1 can direct the RGB light to the downstream system in this mechanism.

The structure of the fluorescent element 30 will now be described.

Figure 4:
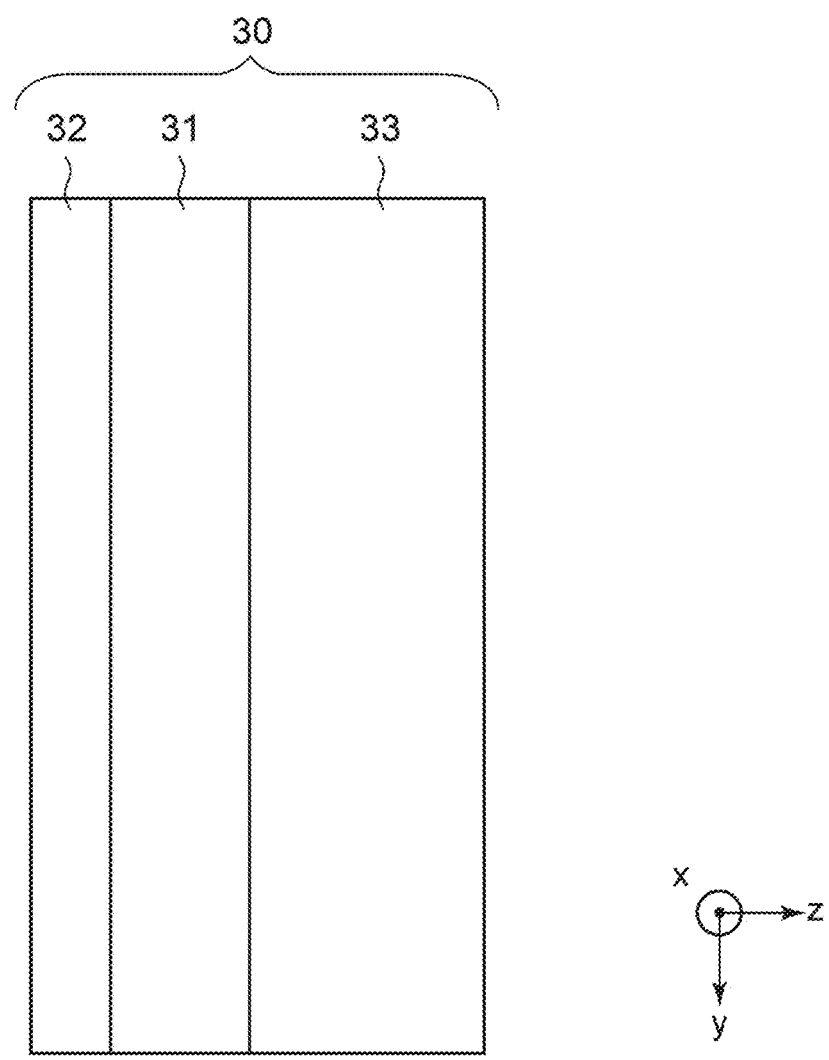
FIG. 4 is a figure for explaining a structure of a reflective fluorescent combined element according to the first embodiment of the present invention.

FIG. 4 illustrates the structure of the fluorescent element 30. As illustrated in FIG. 4, a scattering layer (first scattering layer) 32, a fluorescent light layer (wavelength converting layer) 31, and a reflective element (reflector) 33 are stacked in series in this order from the light incident side (left side in the drawing) to integrally form the fluorescent element 30.

The fluorescent light layer 31 converts a portion of a light flux from the LD light source 10 into fluorescent light (converted light) having a wavelength different from the wavelength of the light flux from the LD light source 10 and emits the fluorescent light and unconverted light having the same wavelength as the light flux from the LD light source 10. The scattering layer 32 scatters a light flux from the LD light source 10 and a light flux from the fluorescent light layer 31. The reflective element 33 reflects a light flux from the fluorescent light layer 31.

The fluorescent light layer 31 is in contact with the scattering layer 32 and provided between the scattering layer 32 and the reflective element 33.

Figure 5:
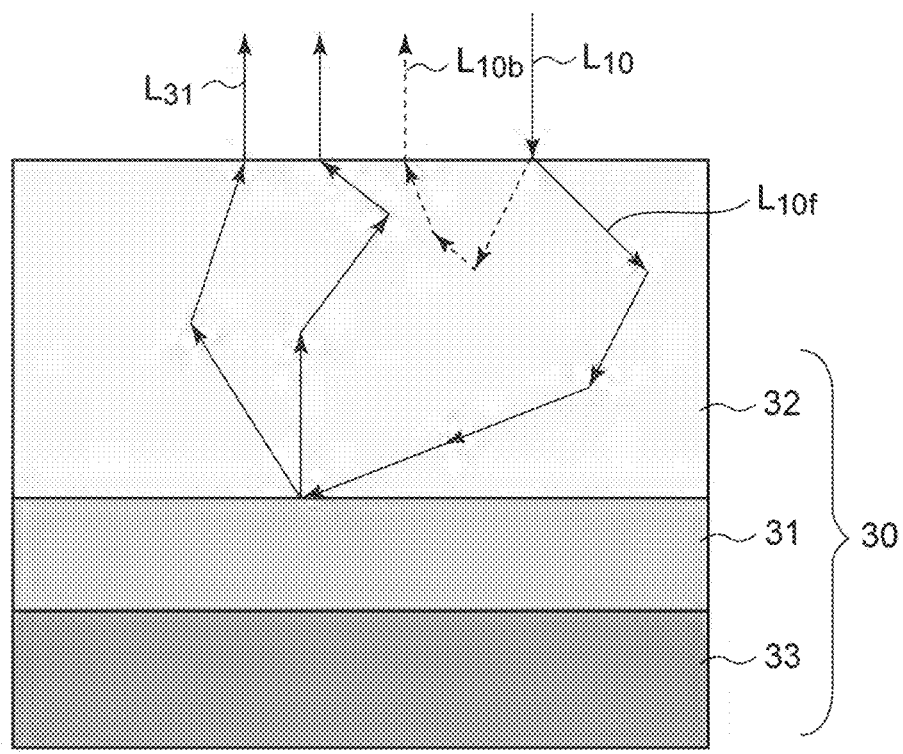
FIG. 5 is a schematic view illustrating forward scattering and backward scattering in the first embodiment of the present invention.

As illustrated in FIG. 5, light $L_{10}$ from the LD light source 10 is separated into backward scattering light $L_{10b}$ and forward scattering light $L_{10f}$ by the scattering layer 32. Note that, FIG. 5 merely illustrates in a schematic manner the effect obtained by the scattering layer 32, so that a portion illustrated in FIG. 5 may not correctly illustrate a portion as in a manner in other drawings.

From the scattering layer 32, the backward scattering light $L_{10b}$ is directed toward the condenser lens system 20, not toward the fluorescent light layer 31. Meanwhile, the forward scattering light $L_{10f}$ traveling from the scattering layer 32 to the fluorescent light layer 31 serves as excitation light and is then converted into fluorescent light $L_{31}$ by the fluorescent light layer 31.

In each of the embodiments of the present invention, the scattering of light to travel from the scattering layer 32 to the fluorescent light layer 31 is referred to as forward scattering, and the scattering of light to travel from the scattering layer 32 to the light source 10 is referred to as backward scattering. In other words, the scattering that directs a light flux from the light source 10 to the fluorescent element 30 to enter the fluorescent element 30 is the forward scattering, and the scattering that directs a light flux to travel from the fluorescent element 30 to the light source 10 is the backward scattering.

As described above, by providing the scattering layer 32 to the input side of the fluorescent light layer 31, a portion of excitation light can be separated out before the excitation light enters the fluorescent light layer 31. In this manner, even for a fluorescent element having a fluorescent light layer that converts a portion of excitation light in the blue-color band range into light in the range of green-color band and red-color band, degradation of color balance of a projected image caused by a shortfall of light in the blue-color band range compared to light in the range of green-color band and red-color band is minimized.

Furthermore, in the embodiment, the amount of excitation light that enters the fluorescent light layer 31 but is then absorbed by a fluorescent particle to turn into heat and thus does not contribute to the brightness of a projected image is reduced. In other words, an optical element that can reduce a loss in excitation light can be provided.

A structure that enhances the effect described above or provides another different effect will now be described.

The scattering layer 32 includes white microparticles (first particles) of, for example, barium sulfate, and a transmissive support material (first binder) of, for example, silicone resin.

With the white microparticles having a refractive index higher than the refractive index of the transmissive support material, in other words, with a great difference between the refractive index of the white microparticles and the refractive index of the transmissive support material, the amount of backward scattering light $L_{10b}$ in the scattering layer 32 is increased. A larger portion of the excitation light can thus be separated out before the excitation light enters the fluorescent light layer 31. For example, the refractive index of the white microparticles is preferably greater than the refractive index of the transmissive support material, and the difference between the refractive index of the white microparticles and the refractive index of the transmissive support material is preferably 0.2 or greater.

In the embodiment, barium sulfate, which has a refractive index of 1.64, and silicone resin, which has a refractive index of approximately from 1.4 to 1.5, are used. The backward scattering can be increased by using white microparticles having a higher refractive index. Alternatively, zinc oxide, which has a refractive index of 2.0, or titanium oxide, which has a refractive index of 2.7, may be used for microparticles.

A scattering amount can be controlled by changing the size of microparticles, and microparticles having a particle size of approximately from 100 nm to 10 µm are preferable. Instead of using silicone resin for the transmissive support material as described above, any other material that has a high transmittance in the visible light band and is capable of fixing therein fluorescent particles and white microparticles can be used.

The fluorescent light layer 31 includes fluorescent particles and a transmissive support material (second binder) such as silicone resin. When the refractive index of the transmissive support material of the scattering layer 32 and the refractive index of the transmissive support material of the fluorescent light layer 31 are identical, an interface is not likely to be created between the scattering layer 32 and the fluorescent light layer 31 and thus a loss in light amount can further be minimized. In the embodiment, the transmissive support material of the scattering layer 32 and the transmissive support material of the fluorescent light layer 31 are the same, so that the refractive indexes of the scattering layer 32 and the fluorescent light layer 31 are identical.

A condition under which a suitable color balance is obtained will now be described. A suitable color balance in the embodiment is obtained in the range expressed by $0.300<y<0.400$ in the xyz color system specified in Japanese Industrial Standards (JIS Z 8701).

To determine a condition to obtain a suitable color balance, a suitable peak ratio of excitation light to fluorescent light is determined.

Figure 6A:
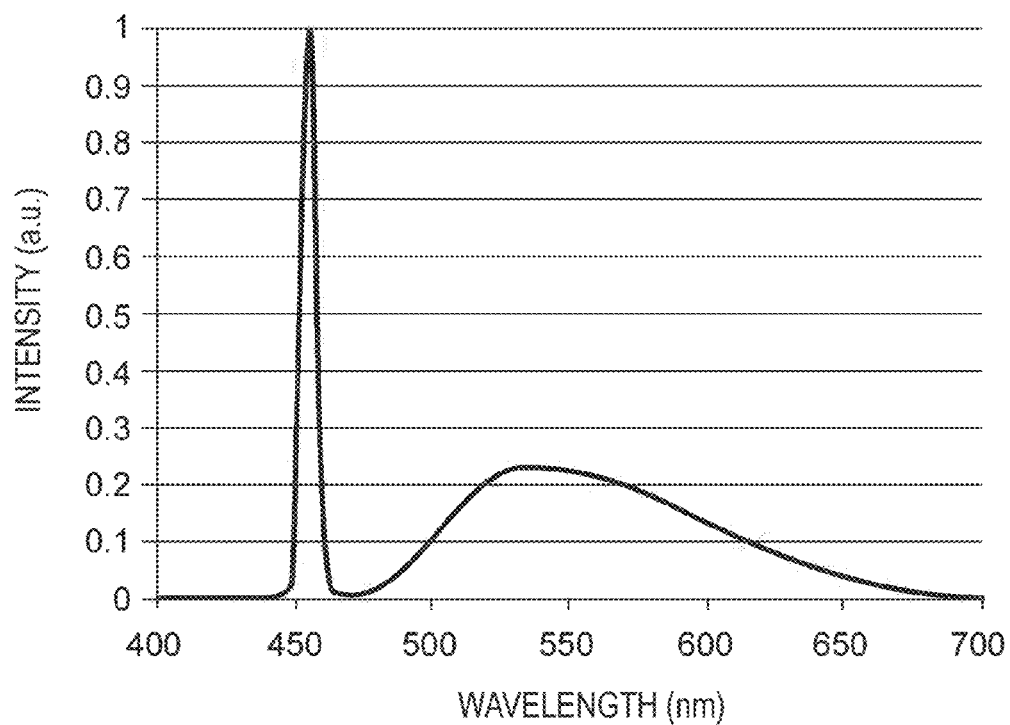
FIGS. 6A and 6B are figures for explaining a change in distribution ratio of excitation light and fluorescent light in the first embodiment of the present invention.
Figure 6B:
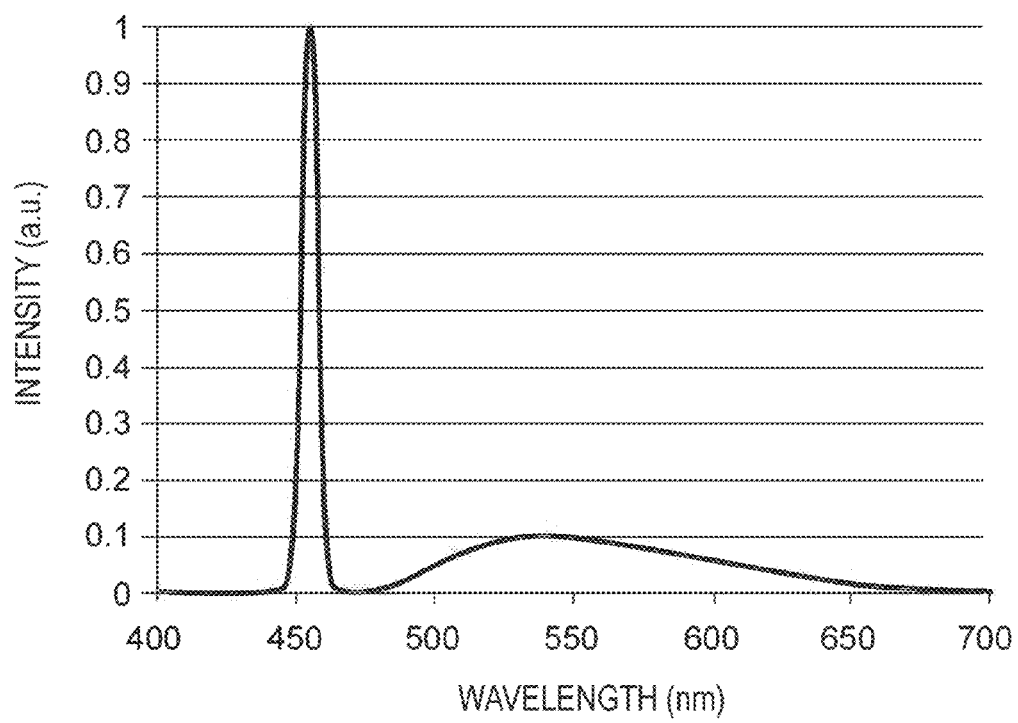

FIGS. 6A and 6B illustrate the peak ratio for a case where the center wavelength of the unconverted light is 455 nm and the light emission center wavelength of the fluorescent light is 530 nm. FIG. 6A illustrates a case where the peak ratio of unconverted light to fluorescent light is 4.35, and FIG. 6B illustrates a case where the peak ratio of unconverted light to fluorescent light is 9.53.

The peak ratio is the ratio of the maximum intensity in the wavelength band of the unconverted light to the maximum intensity in the wavelength band of the fluorescent light. A condition within the range of $0.300<y<0.400$ can be obtained by setting the peak ratio within the range from 4.35 to 9.53 as described above.

That is, a suitable color balance is easily obtained by the fluorescent element 30 satisfying a condition expressed by the formula given below, where G is the intensity of the center wavelength of excitation light and H is the intensity of the center wavelength of fluorescent light.

$$4.35 \leq G/H \leq 9.53 \quad \text{Formula 1}$$

A suitable color balance can easily be obtained also by suitably setting the ratio of forward scattering amount to backward scattering amount in the scattering layer 32.

Specifically, it is preferable that the fluorescent element 30 satisfies a condition expressed by the formula given below, where A is the forward scattering amount and B is the backward scattering amount in the scattering layer 32.

$$2 < A/B < 19 \quad \text{Formula 2}$$

By the fluorescent element 30 satisfying Formula 2, an obtained color balance is outside the suitable color balance range but is still practically acceptable.

Values of numerical embodiments and comparative examples are listed in Table 1. In Table 1, $y_0$ is a y-value of mixed light. The mixed light is combined light of the light emitted from the fluorescent light layer 31 under no scattering layer 32, specifically, fluorescent light, which is converted light, and unconverted light having the same wavelength as the excitation light. Different values of $y_0$ represent different fluorescent characteristics of the fluorescent light layer 31 serving as a fluorescent light body (fluorescent light-emission efficiency of fluorescent light body), that is, the different balances between the fluorescent light and the unconverted light.

TABLE 1

|  | $y_0$ | A/B | y | $0.300 < y < 0.400$ |
|---|---|---|---|---|
| FIRST NUMERICAL EMBODIMENT | 0.49 | 3.0 | 0.310 | ○ |
| SECOND NUMERICAL EMBODIMENT | 0.49 | 4.0 | 0.336 | ○ |
| THIRD NUMERICAL EMBODIMENT | 0.49 | 6.0 | 0.367 | ○ |
| FOURTH NUMERICAL EMBODIMENT | 0.49 | 9.6 | 0.399 | ○ |
| FIFTH NUMERICAL EMBODIMENT | 0.45 | 4.0 | 0.304 | ○ |
| SIXTH NUMERICAL EMBODIMENT | 0.45 | 9.6 | 0.367 | ○ |
| FIRST COMPARATIVE EXAMPLE | 0.49 | 1.5 | 0.254 | X |
| SECOND COMPARATIVE EXAMPLE | 0.49 | 19.0 | 0.435 | X |

Table 1 shows that a preferable color balance in the range of $0.300<y<0.400$ can be obtained for different values of $y_0$ of the fluorescent light layer 31, if the fluorescent element 30 satisfies a condition expressed by the formula given below, which condition being more preferable than a condition expressed by Formula 2.

$$4.0 \leq A/B \leq 9.6 \quad \text{Formula 2A}$$

The forward scattering amount is preferably larger than the backward scattering amount in the scattering layer 32 to obtain a suitable color balance as described above. A backward scattering amount larger than a forward scattering amount in the scattering layer 32 is not preferable, because the amount of fluorescent light and the y-value are reduced, which causes degradation in color balance.

The fluorescent light layer 31, which is a light emitting layer, need to have a thickness of approximately 50 µm or above, preferably 200 µm or above, to have a sufficient light-emission efficiency.

The improvement in efficiency however almost saturates when the thickness of the fluorescent light layer 31 is larger than 500 µm. Meanwhile, the minimum required backward scattering can be obtained if the scattering layer 32 has a thickness of approximately 20 µm. However, if the thickness of the scattering layer 32 is larger than 100 µm, a sufficient forward scattering cannot be obtained even with adjustment of density.

It is preferable that the fluorescent element 30 satisfies the formula given below, where C is the thickness of the fluorescent light layer 31 and D is the thickness of the scattering layer 32.

$$0.5 < C/D < 25 \quad \text{Formula 3}$$

In other words, it is preferable that the fluorescent light layer 31 has the thickness C from 50 µm to 500 µm, and the scattering layer 32 has the thickness D from 20 µm to 100 µm. With the fluorescent element 30 satisfying a condition expressed by Formula 3, the decrease in the light-emission efficiency of the fluorescent light layer 31 can be minimized, and at the same time, a suitable forward scattering amount and a suitable backward scattering amount can be obtained.

It is further preferable that the fluorescent element 30 satisfies a condition expressed by the formula given below.

$$4.0 < C/D < 20 \qquad \text{Formula 3A}$$

It is further preferable that the fluorescent element 30 satisfies a condition expressed by the formula given below.

$$5.0 < C/D < 15 \qquad \text{Formula 3B}$$

Figure 7:
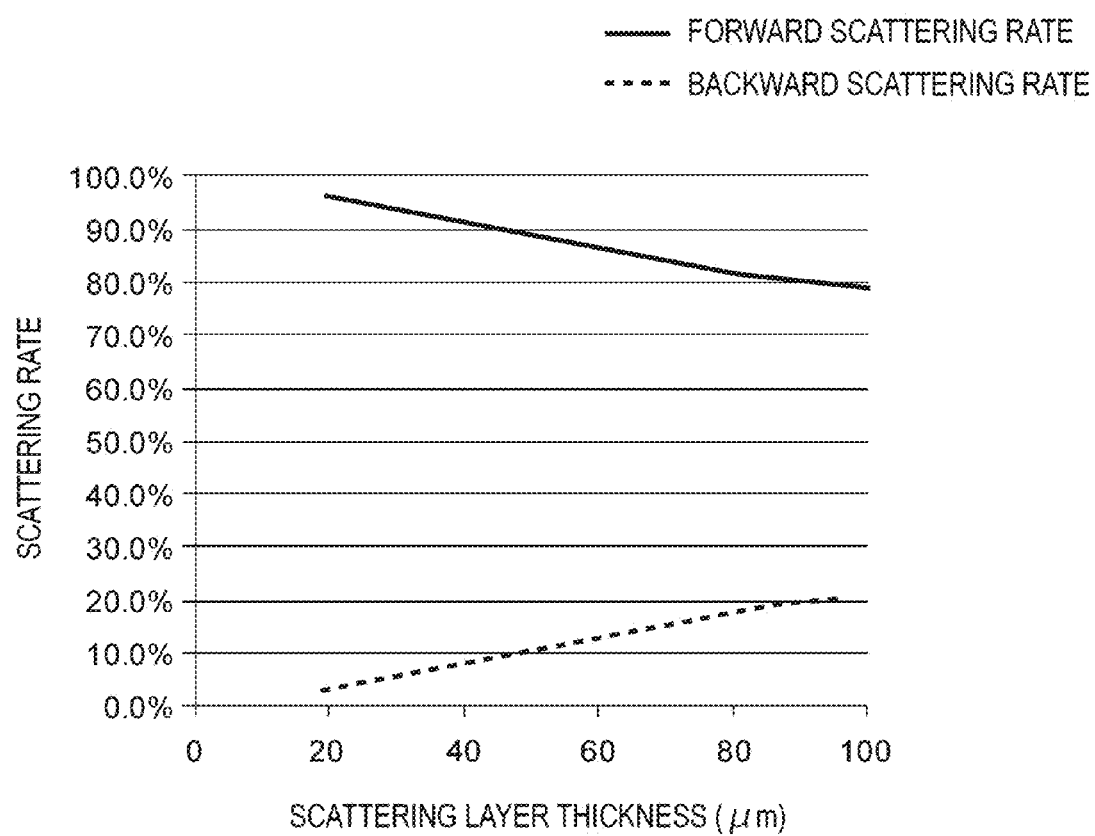
FIG. 7 is a figure for explaining a distribution of forward scattering and backward scattering in the first embodiment of the present invention.

A suitable color balance can be obtained also by adjusting the thickness of the scattering layer 32. FIG. 7 illustrates changes in the forward scattering rate and the backward scattering rate with the thickness of the scattering layer 32 under constant density and particle size. The forward scattering rate is the ratio of the light amount of incident light to the light amount of forward scattered light. The backward scattering rate is the ratio of the light amount of incident light to the light amount of backward scattered light. In FIG. 7, the sum of the forward scattering rate and the backward scattering rate is approximately 100%.

The thickness of the scattering layer 32 preferably ranges from 20 μm to 95 μm. Within this range, the backward scattering rate ranges from 5% to 20%. In other words, the forward scattering rate ranges from 80% to 95%.

By adjusting the thickness of the scattering layer 32 to distribute the forward scattering amount and the backward scattering amount so as to satisfy the conditions described above, a suitable color balance can be obtained.

Although the distribution ratio of the forward scattering and the backward scattering is adjusted by changing only the thickness of the scattering layer 32 in the example described above, the distribution ratio can be adjusted by changing the density or the refractive index of particles.

For example, a higher density of white microparticles in the scattering layer 32 or a larger thickness of the scattering layer 32 causes greater backward scattering, which results in a larger portion of the excitation light from the LD light source 10 being guided to the LD light source 10. In contrast, a smaller density of white microparticles or a smaller thickness of the scattering layer 32 causes greater forward scattering, which results in a larger portion of the excitation light being guided to the fluorescent light layer 31.

In the embodiment, the reflective element 33 is made of a metal having a high reflectivity in the visible light spectrum, such as aluminum. The reflective element 33 is preferably made of metal to radiate heat generated in the fluorescent light layer 31. Alternatively, the reflective element 33 may be ceramic or glass that is added with a dielectric multilayered film to raise reflectivity.

The light amount resulting from subtracting the backward scattering amount from the light amount of the excitation light from the LD light source 10 may be construed as the forward scattering amount.

Second Embodiment

The structure of a fluorescent element 130 according to a second embodiment of the present invention will now be described referring to FIG. 8.

The difference between the fluorescent element 30 described in the first embodiment and the fluorescent element 130 of the second embodiment is that a scattering layer 34 (second scattering layer) is provided between a fluorescent light layer 31 and a reflective element 33.

Figure 8:
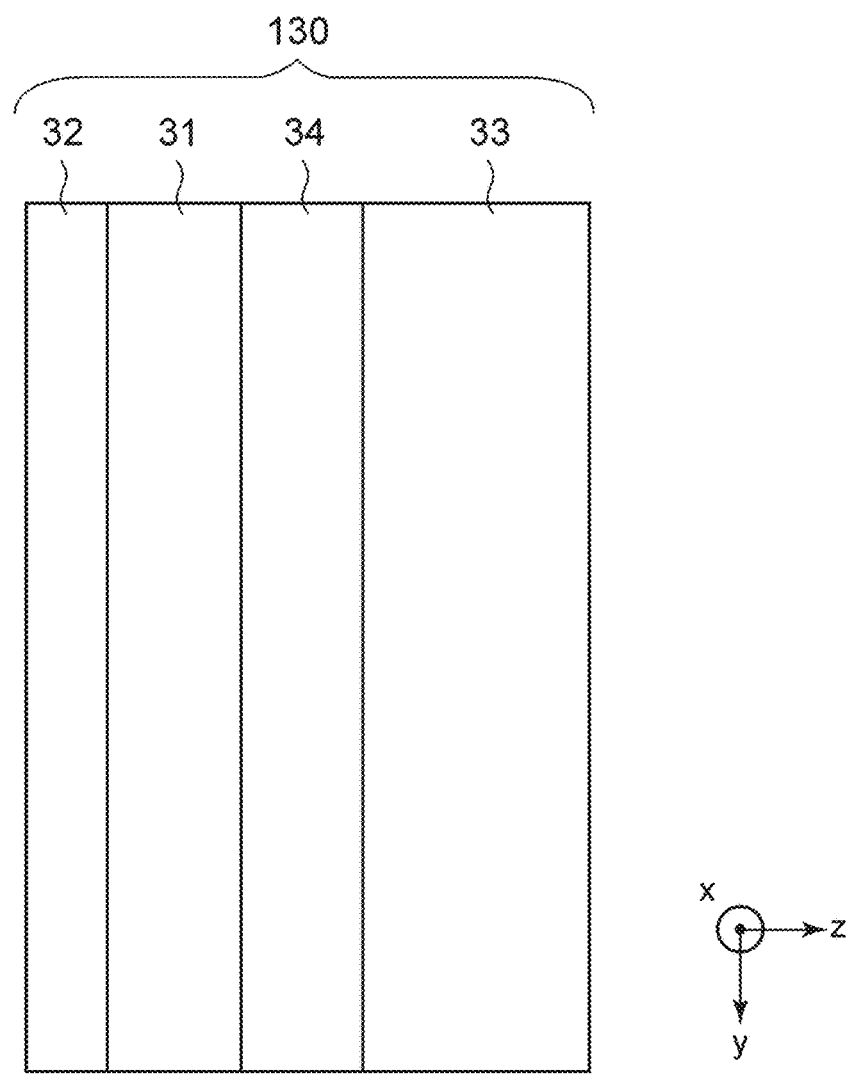
FIG. 8 is a figure for explaining a structure of a reflective fluorescent combined element according to a second embodiment of the present invention.

As illustrated in FIG. 8, a scattering layer 32 (first scattering layer), the fluorescent light layer 31, the scattering layer 34 (second scattering layer), and the reflective element 33 are stacked in series to the plus side along the z axis direction to integrally constitute the fluorescent element 130.

Similarly to the first embodiment, light from an LD light source 10 is collimated to be a collimated light by a collimator lens 11 and guided to the fluorescent element 130 by a condenser lens system 20.

The light from the condenser lens system 20 first enters the scattering layer 32. A portion of the entered light is directed to travel from the scattering layer 32 toward the condenser lens system 20 instead of being guided to the fluorescent light layer 31. The rest of the light is guided to the fluorescent light layer 31. This mechanism improves the hue of the light from the fluorescent element 30 in the first embodiment as described above.

In the first embodiment and in the second embodiment, the reflective element 33 is an aluminum plate. A metal substrate, such as an aluminum plate, absorbs a portion of the light reflecting on the metal substrate. For the fluorescent element 130, as illustrated in FIG. 7, a portion of the light entering the reflective element 33 is absorbed by the reflective element 33, resulting in an increased loss in light amount.

Regarding this problem, the scattering layer 34 is provided between the fluorescent light layer 31 and the reflective element 33 in the second embodiment. With the scattering layer 34 provided, a portion of the light directed toward the reflective element 33 among portions of light that are emitted in undetermined directions from the fluorescent light layer 31 is directed, instead of entering the reflective element 33, toward the condenser lens system by the backward scattering effect of the scattering layer 34.

That is, by providing the scattering layer 34 between the fluorescent light layer 31 and the reflective element 33, a loss in light amount caused by the metal substrate absorbing the incident light is minimized.

It is preferable, as described above, that the scattering layer 34 guides not much amount of the light from the fluorescent light layer 31 to the reflective element 33. That is, it is preferable that the backward scattering amount in the scattering layer 34 is larger than the forward scattering amount in the scattering layer 34. Therefore, when a similar type of white microparticles are used in the scattering layer 34, the particle density of the white microparticles need to be high or the thickness of the scattering layer 34 need to be large.

For the scattering layer 32, in contrast to the scattering layer 34, the particle density of white microparticles need to be low or the thickness of the scattering layer 32 need to be small, because incident light need to be guided to the fluorescent light layer 31.

Specifically, it is preferable that the fluorescent element 130 satisfies a condition expressed by the formula given below, where E is the forward scattering amount and F is the backward scattering amount of the scattering layer 34.

$$0 < E/F < 0.25 \qquad \text{Formula 4}$$

Formula 4 indicates that the backward scattering amount F is larger than the forward scattering amount E. The loss in light amount can be minimized by the fluorescent element 130 satisfying the relationship described above.

The loss in light amount can further preferably be minimized by the fluorescent element 130 satisfying the formula given below.

$$0 < E/F < 0.1 \qquad \text{Formula 4A}$$

Third Embodiment

The arrangement of a projector (projection display apparatus) 2 on which the light source device 1 described in the first and second embodiments can be mounted will now be described as a third embodiment with reference to FIG. 9.

In addition to the light source device 1, the projector 2 includes an illumination optical system α that receives a light from the light source device 1, a light modulating element 50, a projection optical system 60, and a color separating/combining system 14 that guides light from the illumination optical system α to the light modulating element 50 and light from the light modulating element 50 to the projection optical system 60.

The illumination optical system α includes a polarization conversion element 13, a condenser lens 23, and first and second fly-eye lenses (not shown).

Light from the light source device 1, which is mixed light of p-polarized light and s-polarized light, passes through the polarization conversion element 13 to be converted into p-polarized light and is then guided to the condenser lens 23.

The light condensed by the condenser lens 23 passes through a polarization beam splitter provided in the color separating/combining system 14 and is then guided to the light modulating element 50. The guided light is modulated by the light modulating element 50 instructed by an image signal. The modulated light is reflected by the polarization beam splitter provided in the color separating/combining system 14 and then guided to the projection lens (projection optical system) 60 to be projected on a screen or the like (not shown) in an enlarged manner.

Figure 9:
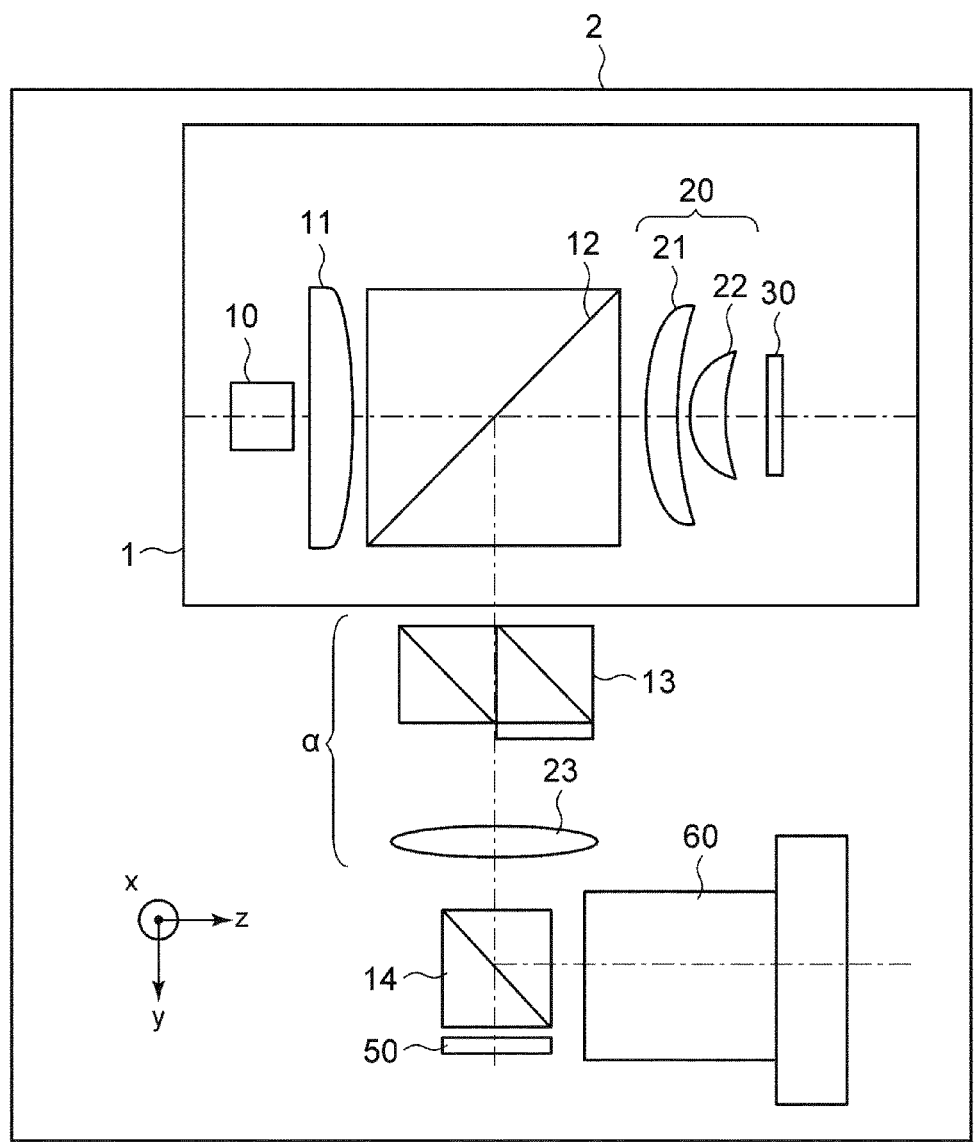
FIG. 9 illustrates an arrangement of a projection display apparatus according to a third embodiment of the present invention.

FIG. 9 illustrates an arrangement around the color separating/combining system 14 in a simplified manner. Although not illustrated in FIG. 9, three light modulating elements for RGB colors are provided around the color separating/combining system 14. The color separating/combining system 14 uses a dichroic mirror, the polarization beam splitter, and a combining prism, which are not shown in the drawing, to resolve a light flux from the illumination optical system α by each wavelength range of each color and guides each light to the light modulating element of the corresponding color. The color separating/combining system 14 then combines lights each resulting from modulation in the light modulating element of the corresponding color and guides the combined light to the projection lens 60. In short, the color separating/combining system 14 guides the light flux from the illumination optical system α to the light modulating element and then guides the light flux from the light modulating element to the projection lens 60.

Fourth Embodiment

Figure 10:
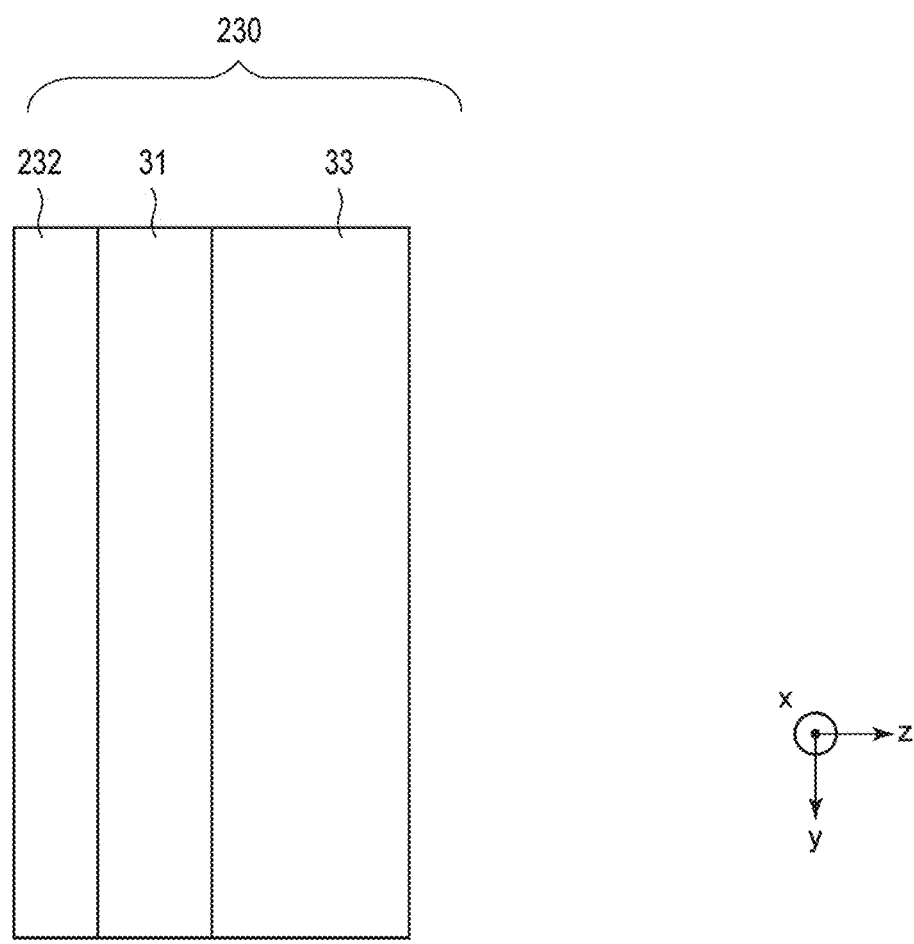
FIG. 10 is a figure for explaining a structure of a reflective fluorescent combined element according to a fourth embodiment of the present invention.
Figure 11:
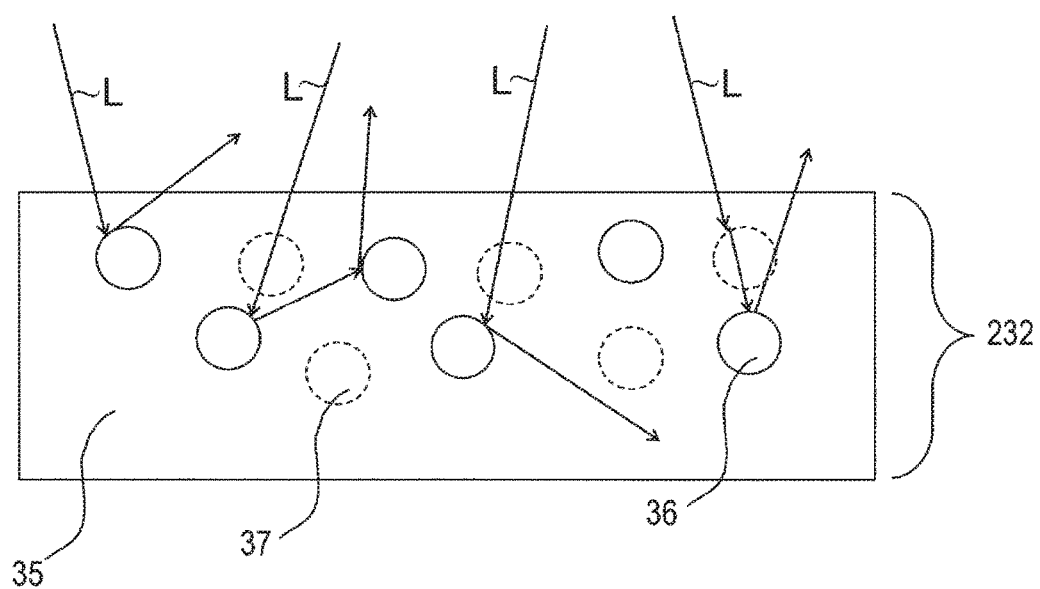
FIG. 11 is a figure for explaining a structure of a scattering layer according to the fourth embodiment of the present invention.

The structure of a fluorescent element 230 according to a fourth embodiment of the present invention will now be described referring to FIGS. 10 and 11. The optical element described in the fourth embodiment can be mounted on the projector illustrated in FIG. 9, as in a manner described in the first and second embodiments.

In the embodiment, a scattering layer 232 having a structure different from the scattering layer 32 of the first embodiment is stacked on the fluorescent element 31. As illustrated in FIG. 11, the scattering layer 232 includes white microparticles (first particles) 36, non-scattering particles (second particles) 37, and a transmissive support material 35 that supports the white microparticles 36 and the non-scattering particles 37. The refractive index of the transmissive support material 35 ranges from 1.4 to 1.5, and the refractive index of the non-scattering particle 37 also ranges from 1.4 to 1.5. It is preferable that the transmissive support material 35 and the non-scattering particle 37 have an identical refractive index. In the embodiments described above, that the refractive indexes are identical does not necessarily mean that the refractive indexes are strictly identical. For example, the difference between the refractive indexes may be 0.1 or smaller, more preferably, 0.05 or smaller.

As described above, the scattering layer 232 of the embodiment is provided, in addition to the white microparticles 36 that scatter light, with the non-scattering particles 37 that have a refractive index closer to the refractive index of the transmissive support material 35 than the refractive index of the white microparticles 36. This minimizes the increase in scattering amount, and at the same time, the proportion of the transmissive support material 35 in the scattering layer 232 is reduced. This is because, while light is scattered at the boundary between a white microparticle 36 and the transmissive support material 35 where the difference between refractive indexes is large, scattering of light is suppressed at the boundary between a non-scattering particle 37 and the transmissive support material 35 where the difference between refractive indexes is small.

Since the transmissive support material 35 of the embodiment is a resin binder, reduction in the proportion of the transmissive support material 35 reduces the proportion of resin used in the optical element. Since the resin binder is susceptible to coloring by heat, reduction in the proportion of resin can minimize coloring.

In a further preferable embodiment, the heat conductivity of the non-scattering particle 37 is higher than the heat conductivity of the transmissive support material 35. Together with the effect obtained by reducing the proportion of resin, the optical element of the embodiment can radiate a greater amount of heat, and thus the coloring caused by heat can further be minimized. Furthermore, the increase in the heat dissipation of the optical element suppresses the temperature rise of the fluorescent light layer that reduces the wavelength conversion efficiency of the fluorescent particles. Therefore, the light-emission efficiency can be raised.

It is preferable to satisfy a condition expressed by the formula given below, where X is the mass of the transmissive support material 35 and Y is the total mass of the white microparticles 36 and the non-scattering particles 37 supported by the transmissive support material 35.

$$0.50 < Y/X < 2.0 \quad \text{Formula 5}$$

If Y/X exceeds the upper limit expressed in Formula 5, the number of microparticles is too large for the transmissive support material 35. Such a condition is not preferable, because the transmissive support material 35, which is made of silicone resin, is not given a sufficient space to extend, that is, the scattering layer 232 has excessively high viscosity, and thus the forming (applying or printing) of the scattering layer 232 on the fluorescent light layer 31 in a uniform manner is difficult. If Y/X shorts the lower limit expressed in Formula 5, the number of microparticles is too small for the transmissive support material 35. Such a condition is not preferable, because increasing the heat radiation of the optical element and improving the hue of color by taking out blue-color light before the light enters the fluorescent light layer 31 are difficult under such a condition.

It is further preferable to satisfy a condition expressed by the formula given below.

$$0.75 < Y/X < 1.5 \quad \text{Formula 5A}$$

Specifically, as an example, the scattering layer 232 includes barium sulfate as the white microparticle 36, a silica ($SiO_2$) particle as the non-scattering particle 37, and silicone resin as the transmissive support material 35. It goes without saying that other similar materials can be used in the embodiments described above.

Barium sulfate has a refractive index of 1.64 and a heat conductivity of 1.31 W/mK, a silica particle has a refractive index of 1.46 and a heat conductivity of 1.38 W/mK, and silicone resin has a refractive index approximately ranging from 1.41 to 1.50 and a heat conductivity of approximately 0.2 W/mK. The heat radiation of the silicone resin is not high, so that the non-scattering particle 37 having a high heat conductivity and a refractive index of which difference from the refractive index of the transmissive support material 35 is small is preferably added as in the exemplary embodiment (further preferable embodiment).

It is more preferable than the first and second embodiments that an embodiment satisfies a condition expressed by the formula given below, where G is the mass of the scattering layer 32 and H is the mass of the white microparticles included in the scattering layer 32.

$$0.10 < H/G < 0.30 \quad \text{Formula 6}$$

When this condition is satisfied, a suitable balance between the amount of the blue-color light traveling from the scattering layer 32 toward the fluorescent light layer 31 and the amount of the blue-color light emitted from the reflective fluorescent combined element 30 instead of traveling from the scattering layer 32 toward the fluorescent light layer 31 can be obtained. A condition under which H/G shorts the lower limit expressed in Formula 6 is not preferable, because the amount of the white microparticles is too small in such a condition to take out a sufficient amount of blue-color light before the light enters the fluorescent light layer 31, which results in a shortfall of the blue-color light. A condition under which H/G exceeds the upper limit expressed in Formula 6 is not preferable, because the amount of the white microparticles is too large in such a condition to provide a sufficient amount of blue-color light that enters the fluorescent light layer 31, which results in a shortfall of green-color light and red-color light.

It is further preferable to satisfy the condition expressed by the formula given below.

$$0.12 < H/G < 0.22 \quad \text{Formula 6A}$$

H/G is 0.17 in the first and second embodiments.

Mass ratios among the scattering layer, microparticles, and the binder expressed in Formulas 5 and 6 may be measured by, for example, cutting out a part of the scattering layer.

Exemplary Modification

The present invention is not limited to the structure that includes a reflective element 33 as a substrate and a fluorescent light layer 31 or a second scattering layer 34 stacked on the reflective element 33 as described in the embodiments. Any structure that is provided with a reflective portion that reflects light from the fluorescent light layer 31 may be used. The reflective portion may be the reflective element 33 serving as a substrate, or alternatively, may be, for example, a reflective film applied on the face, opposite a first scattering layer 32, of the fluorescent light layer 31.

In the second embodiment, first particles and a first binder included in the first scattering layer 32 need not be respectively identical to the particle and the binder included in a second scattering layer 34.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-115236, filed Jun. 5, 2015, and 2016-096258, filed May 12, 2016, which are hereby incorporated by reference herein in their entirety.

What is claimed is:

1. An optical element comprising:
   a wavelength converting layer configured to convert a portion of a light flux from a light source into a converted light having a wavelength different from a wavelength of the light flux from the light source;
   a first scattering layer including a first particle and a first binder supporting the first particle, the first scattering layer being configured to scatter a light flux from the light source which incidents the first scattering layer via an incident surface of the first scattering layer and a light flux from the wavelength converting layer; and
   a reflector configured to reflect a light flux from the wavelength converting layer, wherein
   the wavelength converting layer is provided between the first scattering layer and the reflector in a direction normal to the incident surface.

2. The optical element according to claim 1, wherein the first scattering layer is in contact with the wavelength converting layer.

3. The optical element according to claim 1, wherein the first particle has a refractive index higher than a refractive index of the first binder.

4. The optical element according to claim 3, wherein the wavelength converting layer includes a fluorescent particle and a second binder, and
   a refractive index of the first binder is identical to a refractive index of the second binder.

5. The optical element according to claim 1, wherein a forward scattering amount in the first scattering layer is larger than a backward scattering amount in the first scattering layer, the forward scattering being scattering in a direction of a light flux traveling from the light source toward the optical element, the backward scattering being scattering in a direction from the optical element toward the light source.

6. The optical element according to claim 5, wherein a condition expressed by $2 < A/B < 19$ is satisfied, A being the forward scattering amount in the first scattering layer, B being the backward scattering amount in the first scattering layer.

7. The optical element according to claim 1, wherein the wavelength converting layer is a fluorescent light layer including a fluorescent particle, and
   a condition expressed by $0.5 < C/D < 25$ is satisfied, C being a thickness of the fluorescent light layer, D being a thickness of the first scattering layer.

8. The optical element according to claim 1, further comprising
   a second scattering layer provided between the wavelength converting layer and the reflector.

9. The optical element according to claim 8, wherein the second scattering layer is in contact with the wavelength converting layer.

10. The optical element according to claim 8, wherein a backward scattering amount in the second scattering layer is larger than a forward scattering amount in the second scattering layer, the forward scattering being scattering in a direction of a light flux traveling from the light source toward the optical element, the backward scattering being scattering in a direction from the optical element toward the light source.

11. The optical element according to claim 10, wherein a condition expressed by 0<E/F<0.25 is satisfied, E being the forward scattering amount in the second scattering layer, F being the backward scattering amount in the second scattering layer.

12. The optical element according to claim 1, wherein the reflector is a substrate configured to reflect light from the wavelength converting layer.

13. The optical element according to claim 1, wherein a condition expressed by 0.10<H/G<0.30 is satisfied, G being a mass of the first scattering layer, H being a total mass of the first particles included in the first scattering layer.

14. The optical element according to claim 1, wherein the first scattering layer includes a second particle having a refractive index closer to a refractive index of the first binder than a refractive index of the first particle.

15. The optical element according to claim 14, wherein a heat conductivity of the second particle is higher than a heat conductivity of the first binder.

16. The optical element according to claim 14, wherein a condition expressed by 0.50<Y/X<2.0 is satisfied, X being a mass of the first binder, Y being a total mass of the first particles and the second particles.

17. A light source device comprising:
an optical element;
a solid light source configured to emit a light flux to excite the optical element; and
a condenser lens system configured to guide a light flux from the solid light source to the optical element,
wherein
the optical element comprises
a wavelength converting layer configured to convert a portion of a light flux from the solid light source into converted light having a wavelength different from a wavelength of the light flux from the solid light source,
a first scattering layer including a first particle and a first binder supporting the first particle, the first scattering layer being configured to scatter a light flux from the solid light source which incidents the first scattering layer via an incident surface of the first scattering layer and a light flux from the wavelength converting layer, and
a reflector configured to reflect a light flux from the wavelength converting layer, and
wherein
the wavelength converting layer is provided between the first scattering layer and the reflector in a direction normal to the incident surface.

18. A projection display apparatus comprising:
a light modulating element;
a light source device;
an illumination optical system configured to illuminate the light modulating element with a light flux from the light source device; and
a color separating/combining system configured to guide a light flux from the illumination optical system to the light modulating element and a light flux from the light modulating element to a projection optical system,
wherein
the light source device comprises
an optical element,
a solid light source configured to emit a light flux to excite the optical element, and
a condenser lens system configured to guide a light flux from the solid light source to the optical element,
wherein
the optical element comprises
a wavelength converting layer configured to convert a portion of a light flux from the solid light source into converted light having a wavelength different from a wavelength of the light flux from the solid light source,
a first scattering layer including a first particle and a first binder supporting the first particle, the first scattering layer being configured to scatter a light flux from the solid light source which incidents the first scattering layer via an incident surface of the first scattering layer and a light flux from the wavelength converting layer, and
a reflector configured to reflect a light flux from the wavelength converting layer, and
wherein
the wavelength converting layer is provided between the first scattering layer and the reflector in a direction normal to the incident surface.

* * * * *